United States Patent [19]
Tufts et al.

[11] Patent Number: 5,420,166
[45] Date of Patent: May 30, 1995

[54] GLYCOLYSIS OF CURED UNSATURATED POLYESTERS FOR PRODUCING A RECYCLE REACTANT

[75] Inventors: Timothy A. Tufts, Powell; Chung-Chieh Tsai; Stephen S. Hupp, both of Dublin, all of Ohio

[73] Assignee: Ashland Oil, Inc., Ashland, Ky.

[21] Appl. No.: 315,870

[22] Filed: Sep. 30, 1994

Related U.S. Application Data

[63] Continuation of Ser. No. 57,118, May 4, 1993, abandoned.

[51] Int. Cl.$^6$ .............................................. C08J 11/04
[52] U.S. Cl. ....................................... 521/40.5; 521/41; 521/43.5; 521/44; 521/45.5; 521/48; 521/48.5; 525/437; 525/440; 525/444; 525/445; 528/272; 528/296; 528/300; 528/303; 528/306; 528/308; 528/481; 528/495; 528/496; 528/502 R; 528/503
[58] Field of Search .......................... 521/40.5, 41, 43.5, 521/44, 45.5, 48, 48.5; 525/437, 440, 444, 445; 528/272, 296, 300, 303, 306, 308, 481, 495, 496, 502, 503

[56] References Cited

U.S. PATENT DOCUMENTS

| | | | |
|---|---|---|---|
| 3,951,886 | 4/1976 | Miyake et al. | 260/23 |
| 3,995,819 | 12/1976 | Kunogi et al. | 241/58 |
| 4,184,829 | 1/1980 | Benkowski et al. | 425/202 |
| 4,983,549 | 1/1991 | Greve | 501/27 |

OTHER PUBLICATIONS

Reinforced Plastics, p. 46 (Oct. 1990).
Taking the Heat Out of Thermoset, Materials Edge No. 33, p. 9 (Feb. 1992).
Lantos Are Plastics Really the Landfill Problem? Chem. Tech Aug. 1990, 473.
Recycling in Action, Reinforced Plastics Feb. 1992, 32–35.
Jutte, et al. Recycling SMC, 46th Annual Conf. Composites Inst., The Soc of Plastics Industry, Inc., Feb. 18–21, 1991.
Tesoro, et al. Chemical Products from Cured unsaturated polyesters, Proc. of the American Chemical Society, Div. of Polymeric Material Science and Engineering, vol. 67, 459–460 (1992).
Tesoro, et al. New Concepts for Recovery of Thermosets 47th Annual Conference Composites Inst. The Society of Plastics Industry, Inc. Feb. 3–6, 1992.
Patel, et al. Recycling of Sheet Molding Compounds (SMC) Proc. of the American Chemical Soc. Div. of Polymeric Material Science and Engineering vol. 67, 455–456 (1992).
Pattel, et al. Alternative Procedures for the Recycling of Sheet Molding Compounds, Advances in Polymer Technology, vol. 12, No. 1, 35–45 (1993).
Kinstle, et al, Chemical Intermediates from Scrap Polymers via Hydrolysis Polymer Preprints vol. 24, No. 2, 446–447 (Aug. 1983).

*Primary Examiner*—Samuel A. Acquah
*Attorney, Agent, or Firm*—Mueller and Smith

[57] ABSTRACT

The present invention is directed to a method for treating cross-linked (cured) filled or unfilled unsaturated polyester for deriving an alcohol recycle reactant useful in the synthesis of alcohol-formed derivative products. The first step of the method is the attrition of the cured unsaturated polyester to form particulates thereof. In the next step of the process, at least a fraction of any filler or fiberglass in the cured unsaturated polyester is separated to form a cured unsaturated polyester regrind. The next step is the subjecting of the cured unsaturated polyester regrind to agitated, uncatalyzed or catalyzed glycolysis in the presence of excess glycol and, optionally, a transesterification catalyst under agitation at elevated transesterification temperature. The final step of the process is the recovery of the recycle alcohol reactant for use in the synthesis of alcohol-formed derivative products. The glycolysis reaction is conducted under agitation in order to keep the cured unsaturated polyester regrind solids suspended during the glycolysis reaction. In this regard, establishment of shear conditions should aid in the glycolysis step of the process.

19 Claims, No Drawings

GLYCOLYSIS OF CURED UNSATURATED POLYESTERS FOR PRODUCING A RECYCLE REACTANT

This is a continuation of application Ser. No. 08/057,118 filed on May 4, 1993, now abandoned.

BACKGROUND OF THE INVENTION

The present invention relates to cured unsaturated polyesters as typified by cured sheet molding compound (SMC) and more particularly to the treatment of cured unsaturated polyester for recovery of valuable recycle products.

Thermosets, e.g. phenolics, epoxies, unsaturated polyesters, are widely used as binders in reinforced plastic and composites, where the thermoset can comprise up to 25%–80% of the total composite, and fillers, such as glass (roving, mat, fiber), calcium carbonate and silica comprise the balance. These thermoset binders with specific fillers produce composites of high mechanical properties, chemical resistance, and high thermal stability. A more recent development is sheet molding compound (SMC).

In the United States, The Society of Plastics Industry (SPI) introduced the term SMC to differentiate this material from pre-pregs. One outstanding advantage is that SMC can be molded in one step at a rate approaching the steel-stamping operations of the automotive industry. This characteristic, coupled with high mechanical strength (impact in particular), corrosion resistance, and metallic appearance when painted, has made SMCs popular for the production of automotive and truck hoods, tops, fenders, doors, and in fact, virtually the entire body.

Within the next 5–10 years, given the relatively short life of automobiles, SMC parts will accumulate as they cannot be scrapped in a manner similar to those made from metals. It is, therefore, critical to establish the basic technology required for the economic recycling of SMC parts.

Cured SMC and the like, being thermoset materials, have had the reputation for being non-recyclable because the thermosetting process used in their manufacture is irreversible. *Reinforced Plastics*, p. 46 (Oct. 1990). Thermosets also cannot be remolded into new products after use. "Taking the Heat Out of Thermoset", *Materials Edge*, No. 33, p. 9 (Feb. 1992). Lantos, "Are Plastics Really the Landfill Problem?", *Chem Tech.*, Aug. 1990, 473, excludes thermosets when discussing the recycling of plastics since thermosets are non-meltable.

Those researchers that have confronted the accepted notion that thermosets are non-recyclable generally prefer attrition and separation of the thermoset resin from the filler, with reuse of all fractions as reinforcement. Such is the basis for the ERCOM program in Germany. "Recycling in Action", *Reinforced Plastics*, Feb. 1992, 32–35. Jutte, et at., "Recycling SMC", 46th Annual Conf., Composites Institute, The Society of Plastics Industry, Inc., Feb. 18–21, 1991, reports a variety of approaches to recycling of thermosets including incineration, chemical degradation, pyrolysis, and size reduction.

The chemical degradation of thermosets typically has focused on hydrolysis reactions. For example, Tesoro, et al., report the use of laboratory-produced, unfilled, ideal unsaturated polyester systems which are subjected to neutral hydrolysis with equivocal results being reported. "Chemical Products from Cured Unsaturated Polyesters", Proceedings of the American Chemical Society, Division of Polymeric Material Science and Engineering, Vol. 67, 459–460 (1992); "New Concepts for Recovery of Thermosets", 47th Annual Conf., Composites Institute, The Society of Plastics Industry, Inc., Feb. 3–6, 1992; "New Concepts for Recovery of Thermosets". Patel, et al., "Recycling of Sheet Molding Compounds (SMC)", Proceedings of the American Chemical Society, Division of Polymeric Material Science and Engineering, Vol. 67,455–456 (1992), report that hydrolysis of extracted ground SMC under vigorous hydrolytic conditions even for long periods gave poor yields of about 1.5%. Patel, et al., "Alternative Procedures for the Recycling of Sheet Molding Compounds", *Advances in Polymer Technology*, Vol. 12, No. 1, 35–45 (1993), also reports hydrolysis yields to be about 1.5%. It should be noted that Kinstle, et al., "Chemical Intermediates from Scrap Polymers Via Hydrolysis", *Polymer Preprints*, Vol. 24, No. 2, 446–447 (Aug. 1983) reports the neutral hydrolysis of styrene-cross linked unsaturated polyesters at 200°–275° C. for 2–12 hours with reported products being isophthalic acid, styrene-fumaric acid copolymer, and unhydrolyzed polyester feedstock.

Clearly, the art has identified a compelling need to enable manufacturers to recycle cured unsaturated polyesters, and hopefully make such recycle economic and efficient.

BROAD STATEMENT OF THE INVENTION

The present invention is directed to a method for treating filled or untilled cured unsaturated polyester for deriving an alcohol (e.g., polyol) recycle reactant useful in the synthesis of alcohol-formed derivative products. The first step of the method is the attrition of the cured unsaturated polyester to form particulates thereof. In the next step of the process, at least a fraction of any filler and glass fiber in the cured unsaturated polyester is separated to form a cured unsaturated polyester regrind. The next step is the subjecting of the cured unsaturated polyester regrind to agitated, catalyzed or uncatalyzed glycolysis in the presence of excess glycol and, optionally, a transesterification catalyst under agitation at elevated transesterification temperature. The final step of the process is the recovery of the recycle alcohol reactant for use in the synthesis of alcohol-formed derivative products. The glycolysis reaction is conducted under agitation in order to keep the cured unsaturated polyester regrind solids suspended during the glycolysis reaction. In this regard, establishment of shear conditions should aid in the glycolysis step of the process.

Advantageously, the molar ratio of hydroxyl (from the glycol) to ester (from the cured unsaturated polyester) ranges from about 4 to 30. Conventional anti-foam additives advantageously also are included in the cured unsaturated polyester regrind glycolysis step of the process. Advantageous transesterification temperatures range from about 100° to 300° C.

Advantages of the present invention include the ability to use commercial SMC parts without special cleaning operations being necessary. Thus, paint, adhesives, in-mold coatings, and like contaminants should not interfere with the inventive process. Another advantage is that the process can be conducted at atmospheric pressure which obviates the necessity for expensive pressure vessels. Yet another advantage is the ability to efficiently recycle cured SMC and like molding compounds for production of a useful product. These and other advantages will be readily apparent to those skilled in the art based upon the disclosure contained herein.

DETAILED DESCRIPTION OF THE INVENTION

Referring initially to the cross-linked or cured unsaturated polyester, such compounds typically are formed from unsaturated polyester material, filler, glass, and additives, such as those used for bulk molding compound (BMC), sheet molding compound (SMC), spray-up/lay-up in marine applications (boats, etc.), and the like. The unsaturated polyester materials are based on macromolecules with a polyester backbone in which typically both a saturated acid (such as, for example phthalic, isophthalic, adipic, or azelaic acid), and an unsaturated acid (maleic anhydride, fumaric acid, crotonic acid, isocrotonic acid, vinyl acetic acid, methyl acrylic acid, etc.) are condensed with a dihydric alcohol or glycol. A three-dimensional structure is produced by cross-linking this polyester backbone, through the unsaturated acid or anhydride component, typically with a vinyl monomer and most commonly with styrene. Further information on unsaturated polyesters can be found, for example, by reference to Kirk-Othmer, *Encyclopedia of Chemical Technology*, 3d Ed., Vol. 11, pp 129–138, John Wiley & Sons, New York, N.Y. (1982), the disclosure of which is expressly incorporated herein by reference. Unsaturated vinyl ester resinous compositions additionally can be made by reacting about equivalent proportions of a polyepoxide and an unsaturated mono-carboxylic acid to make a resulting resin which has terminal, polymerizable unsaturated groups. Such vinyl ester resins can be admixed with at least one co-polymerizable monomer (e.g., styrene) for thermally curing or cross-linking to form articles which can be recycled in accordance with the precepts of the present invention. Reference is made to U.S. Pat. No. 5,116,917, and references cited therein, the disclosures of which are expressly incorporated herein by reference.

Additives incorporated into the unsaturated polyester material are conventional in nature. Accordingly, suitable curing agents, accelerating agents, and the like are incorporated. Reinforcement and inert additives and fillers such as, for example, glass, metal filings, and inorganic fillers, such as, for example, sand and clay, also are appropriate. Pigments, release agents, plasticizers, low shrink additives, surface enhancers, and the like also are used as is necessary, desirable, or convenient in conventional fashion. In this regard, the present invention has a distinct advantage in that the cured polyester material can be contaminated with, for example, paints, adhesives, in-mold coatings, and the like, and the treatment process proceed expeditiously to produce the alcohol recycle reactant.

Another class of unsaturated polyester materials include alkyd resins which typically are synthesized from ethylenically unsaturated drying oils and derivatives thereof as such alkyd resins are well known in the art. Further information on alkyd resins can be found, for example, in Solomon, *The Chemistry of Organic Film Formers*, Chapter 5, Robert E. Krieger Publishing Co., Inc., Huntington, New York (1967), the disclosure of which is expressly incorporated herein by reference. Such cured unsaturated alkyd resins can be similarly reinforced to form cured unsaturated polyesters which require recycling in accordance with the precepts of the present invention.

As an initial treatment step, the cured unsaturated polyester is attrited to form cured unsaturated polyester particulates. Cured unsaturated polyester, optionally, can be supplied to the process already in particulate form resulting from, for example, a recovery operation wherein the cured unsaturated polyester is attrited. Attrition can be accomplished in conventional fashion using, for example, augers, hammer mills, ball mills, knife mills, and like conventional attrition processes. It is desirable that the cured unsaturated polyester particulates be less than about 1 mm in average particle size with less than about 0.1 mm particle size being advantageous.

At least a fraction of any filler and glass fiber in the cured unsaturated polyester particulates should be separated out at this stage of the process to form a cured unsaturated polyester regrind. Alternatively, the filler can be separated after the glycolysis step of the process at the expense of handling inert material during the glycolysis step. Separation can be accomplished by conventional screening, gravity (e.g., density), and like techniques as those skilled in the art will appreciate.

The next step of the process involves the agitated, catalyzed or uncatalyzed glycolysis of the cured unsaturated polyester regrind in the presence of excess glycol and, optionally, a transesterification catalyst under agitation conditions at elevated transesterification temperature. Referring initially to the glycols, advantageously such glycols have a boiling point such that the glycols remain substantially in the liquid phase during the glycolysis step of the process. Use of such high boiling glycols means that pressure vessels need not be employed in the present process which contributes to the economies thereof. Suitable glycols include virtually any known difunctional dihydric alcohol including, for example, ethylene glycol, diethylene glycol, triethylene glycol, polyethylene glycol, propylene glycol, dipropylene glycol, polypropylene glycol, 1,3-butanediol, 1,4-butanediol, neopentylglycol, cyclohexane dimethanol, 2,2,4-trimethyl pentanediol, bisphenol A, trimethylol ethane, trimethylol propane, dicyclopentadiene glycol, dibrominepentyl glycol, and the like, and even mixtures thereof. Preferably, the glycol contains two primary hydroxyl groups. By excess glycol is meant that the mole ratio of hydroxyl (from the glycol) to ester (from the cured unsaturated polyester regrind) is at least about 4:1 and advantageously ranges from about 8:1 to 30:1.

If the glycolysis is conducted in the presence of a transesterification catalyst, such catalysts are conventional and include those shown in, for example, U.S. Pats. Nos. 4,609,755 and 4,059,617, the disclosures of which are expressly incorporated herein by reference. Additional transesterification catalysts can be found, for example, by reference to Kirk-Othmer, *Encyclopedia of Chemical Technology*, 3d Ed., Vol. 9, p 307. The proportion of transesterification catalyst is effective for accomplishing the glycolysis reaction and is well known by those skilled in the art. Suitable reaction temperatures include, for example, temperatures ranging from about 100° to about 300° C. and advantageously from about 170° to about 250° C. Additionally, for manufacturing ease, especially at commercial operations, an anti-foaming agent is added during the glycolysis step of the process. Such anti-foaming agents are well known in the art and little more need be said about them. Further information can be found, for example, by reference to *Encyclopedia of Polymer Science and Engineering*, Vol. 2, pp 67–69, John Wiley & Sons, New York, New York (1985), the disclosure of which is expressly incorporated herein by reference.

The glycolysis reaction is conducted for a time ranging from about 1 to 30 hours at which time the reaction is ceased. A recycle alcohol reactant is recovered from the reaction mixture, which reactant is suitable for use in the synthesis of alcohol-formed derivative products. At this stage of the process, additional filler can be separated and/or unreacted cured unsaturated polyester regrind separated for recycle to the glycolysis step of the reaction. The recycle alcohol reactant can be represented conventionally by the following general structure:

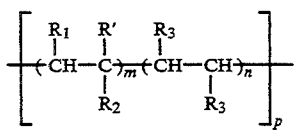
(I)

and optionally a second composition type of structure represented by:

$$R_3-R_4-R_3 \quad (II)$$

and optionally a third composition derived from glycolysis of polyvinylacetate, polymethyl methacrylate and those commonly used a slow profile additives.

where
1) m, n, p are any integers $\geq 0$ (ranging up to about 20);
2) one of $R_1$ or $R_2$ is a hydrogen, and the other of $R_1$ and $R_2$ is one of the following groups: aryl, substituted aryl, or

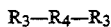

where $R_5$ is a hydrogen atom or an alkyl group (e.g., $C_1-C_8$) such as methyl, ethyl, or the like;
3) R' is a hydrogen atom or a methyl group;
4) $R_3$ is

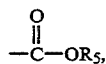

where R'' is a sigma bond or independently,

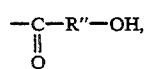

where $Q \geq 1$ and $S \geq 1$, $R_6$ is a hydrogen or an alkyl group (e.g., methyl or ethyl group).

$R_4$ is

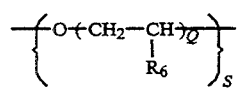

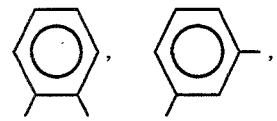

where x=2,3, or 4

As a specific example of such novel alcohol recycle reactant: when $R_1$ is a hydrogen, $R_2$ is a phenyl group; R'=H, m and n each are 1 the novel alcohol recycle reactant product is:

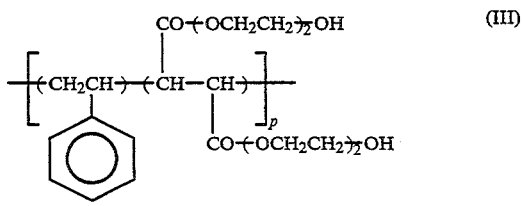
(III)

Optionally, if the glycolized cured resin contains phthalic units, a second alcohol recycle reactant product produced is:

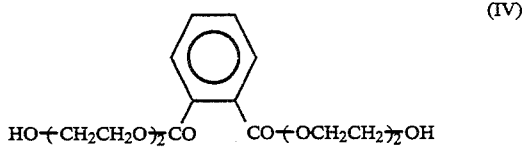
(IV)

The novel recycle alcohol reactant advantageously is a polyester polyol product as set forth above. The recycle alcohol reactant can be used for reaction with polyisocyanates to make polyurethanes, with acrylic acid, methacrylic acid, or dicyclopentadiene half esters of maleic acid, for example, to make unsaturated polyesters, and the like.

Additional products resulting from the reaction of the recycle alcohol reactant and carboxylic acid monomers are unsaturated polyesters such as those represented conventionally below:

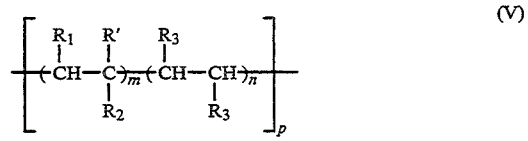
(V)

where
1) m, n, p are any integers $\geq 0$ (ranging up to about 20);
2) one of $R_1$ or $R_2$ is a hydrogen, and the other of $R_1$ and $R_2$ is one of the following groups: aryl, substituted aryl, or:

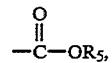

where $R_7$ is alkyl such as methyl, ethyl (e.g., $C_1-C_8$);
3) R' is a hydrogen atom or a methyl group;
4) $R_5$ is

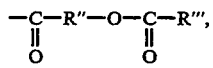

where R″ is

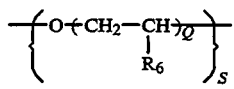

where $Q \geq 1$ and $S \geq 1$, $R_6$ is a hydrogen atom or an alkyl group;
R‴ is one of the following groups:

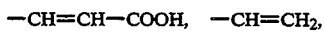

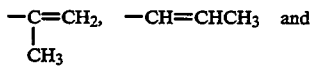

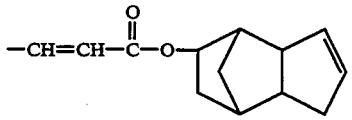

An example of a recycle unsaturated polyester product is

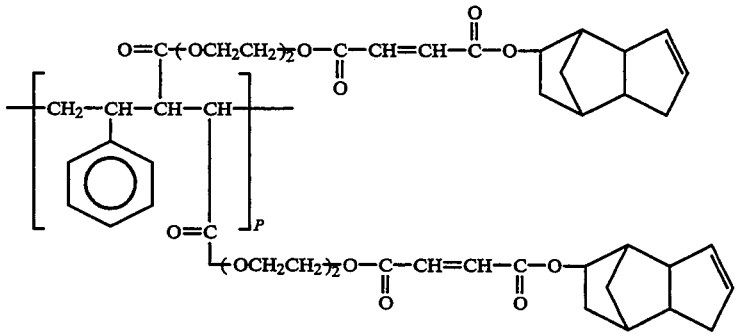

Again such novel unsaturated polyester reactants can be used to form additional cured products by cross-linking, for example, through the ethylenic unsaturation utilizing a copolymerizable monomer in conventional fashion.

The following examples show how the present invention has been practiced, but should not be construed as limiting. In this application, all proportions and percentages are by weight unless expressly otherwise noted. Also, all citations are expressly incorporated herein by reference.

EXAMPLES

Example 1

An unsaturated polyester resin (PHASE ALPHA ® SMC, Ashland Chemical, Inc., Dublin, Ohio) was cured at 250° F. for 10 minutes to make panels having a thickness of 0.125 in. The panels were post-cured at 300° F. for 30 minutes. The cured panels were crushed and ground into powder, hereinafter referred to as "neat thermoset regrind". The neat thermoset regrind was calculated to have an ester equivalent weight of 188 g per mole.

In each of six 100-ml round bottom flasks equipped with a stirrer, a condenser and a thermocouple, was charged the neat thermoset regrind, a glycol, and a catalyst, at various glycol/ester ratios. These mixtures were heated at 220°–240° C. The reaction mixture products were inspected every few hours and their solubility in benzyl alcohol was used to differentiate such products. The reaction conditions and results recorded are set forth in Table I.

TABLE I

| | Digestions of Neat SMC Regrind with Various Hydroxy/Ester Ratios in Glycols | | | | | |
|---|---|---|---|---|---|---|
| Example # | 1A | 1B | 1C | 1D | 1E | 1F |
| Wt. (gm.) of Thermoset Regrind | 10 | 10 | 10 | 10.4 | 9.9 | 10 |
| Mole of Ester | 0.0532 | 0.0532 | 0.0532 | 0.0553 | 0.0527 | 0.0532 |
| Wt. (gm.) of Glycol[1] | DPG-28.6 | DPG-14.3 | DPG-7.2 | DEG-11.7 | DEG-22.3 | DEG-33.8 |
| OH/Ester Mole Ratio[2] | 8/1 | 4/1 | 2/1 | 4/1 | 8/1 | 12/1 |
| Wt. (mg.) of Catalyst[3] | 10 | 10 | 10 | 10.4 | 9.9 | 10 |
| Temperature (°C.) | 220–240 | 220–240 | 220–240 | 220–240 | 220–240 | 220–240 |
| Time (Hours) | 34 | 34 | 34 | 9 | 17.5 | 17.5 |
| Recycle Alcohol Reactant | Viscous Liquid | Viscous Liquid | Solid & Liquid | Solid & Liquid | Solid & Liquid | Viscous Liquid |
| Recycle Alcohol Reactant Solubility in | Soluble | Soluble | Insoluble Solid | Insoluble Solid | Insoluble Solid | Soluble |

TABLE I-continued

Digestions of Neat SMC Regrind with Various Hydroxy/Ester Ratios in Glycols

| Example # | 1A | 1B | 1C | 1D | 1E | 1F |
|---|---|---|---|---|---|---|
| BA[(4)] | | | | | | |

[(1)]DEG is diethylene glycol; DPG is dipropylene glycol
[(2)]It should be noted that digestion at a ratio below 8/1 hydroxyl/ester may be undesirable since an insoluble thermoset can be generated.
[(3)]Ammonium Titanyl Oxalate
[(4)]Benzyl Alcohol

Examples 2–4

In a two gallon autoclave, SMC powder (cured PHASE ALPHA® SMC of Ashland Chemical, Inc.) was mixed with various glycols. The mixtures were heated under various reaction conditions. The resulting mixtures then were centrifuged and the liquid products recovered. The recovered liquid products were stripped under high vacuum at 150° C. to yield nonvolatile residues (Examples 2 and 3) or a viscous product with residual glycol (Example 4). The reactants, reaction conditions, and results recorded are set forth in Table II.

Example 5

Instead of SMC powder (including filler and fiberglass), the neat thermoset regrind of Example 1 was digested with propylene glycol in this example. A soluble product and an insoluble product were resulted. Again, the reactants, reaction conditions, and results recorded are set forth in Table II.

Example 6

The example demonstrates a digestion run at the boiling point of diethylene glycol at ambient atmospheric pressure. Again, the reactants, reaction conditions, and results recorded are set forth in Table II.

TABLE II

| Example # | 2 | 3 | 6 | 5 | 4 |
|---|---|---|---|---|---|
| Reactor | 2-Gal. Autoclave | 2-Gal. Autoclave | 2000-ml Glass | 2-Gal. Autoclave | 2-Gal. Autoclave |
| Neat Thermoset Regrind (g) | — | — | — | 150 | — |
| SMC Powder (g) | 1000 | 1000 | 200 | — | 1000 |
| Weight (g) and type of Glycol | 3000-DEG | 3000-DEG | 600-DEG | 1500-PG | 3000-DEG |
| Catalyst | none | none | none | none | 0.2% Fascat 4100* |
| Reaction Temp. (°C.) | 240~251 | 219~250 | 240~250 | 220~223 | 270 |
| Reaction Time (hours) | 29 | 29 | 29 | 48 | 8 |
| Pressure (psia) | 27~68 | 59~128 | 14.7 | 71~85 | Up to 160 |
| Yield of Solvent Free Recycle Alcohol Reactant (g) | >205 | <100 (containing DEG) | | * | 810 |
| Recycle Alcohol Reactant Hydroxy Value | 450 ± 8 | 581 ± 15 | 430 ± 6 | ** | 890 |
| Recycle Alcohol Reactant Acid Value | 3 | 15 | 6 | | 7 |

*Fascat 4100 is hydrated monobutyltin oxide of M & T Chemicals Inc.
**Mixture of products - a propylene glycol soluble (OH value >400) and a propylene glycol insoluble (OH value <300)

Example 7

In a two gallon autoclave, 3108 g of diethylene glycol, 1400 g of SMC powder (1–30 microns, mean particle size 5 microns, PHX 40 s brand from Phoenix Fiberglass Inc., Ontario, Canada), and 45.1 g of tetrapropyl titanate (Tyzor TPT brand from DuPont) were mixed. The mixture was heated at 250°–253° C. in a closed autoclave for 14.5 hours. The resulting mixture was centrifuged and liquid product collected. The liquid product was stripped to obtain 444 g of viscous product (recycle alcohol reactant) which had a hydroxyl number of 435 and an acid value of 3.

Example 8

In a two gallon reactor, 4662 g of diethylene glycol, 67.6 g triethanolamine/titanium chelating agent (Tyzor TE brand of DuPont), and 0.15 g silicone liquid (Antifoam A compound of Dow Corning) in 0.15 g toluene were mixed. The mixture was heated to 100° C. Then, 2100 g of PHX 40s SMC powder was charged into the reactor while the mixture was being agitated. After achieving homogeneity, the mixture was heated at 240°–247° C. under ambient atmospheric pressure. Glycol vapor was condensed by a condenser and returned to the reactor. After 18 hours of heating, the resulting mixture was cooled and centrifuged. The liquid product (recycle alcohol reactant) was condensed by vacuum distillation.

Example 9

Preparations of Carboxylic Monomers

Carboxylic monomers were made from the reaction of dicyclopentadiene (DCPD) and maleic acid by each of the following four techniques.

9A. In a two liter resin flask, a mixture of 80 g of water and 467 g of DCPD (97% purity, supplied by Exxon Chemical Co.) was stirred and heated under a nitrogen atmosphere. The mixture was heated to 70° C. and maleic anhydride was charged in such a manner that the temperature of the mixture was controlled at between 60°–90° C. After a total of 346 g of maleic anhydride was charged, the reaction temperature was raised to 115°–125° C. until a clear solution resulted. The product was then heated at 120°–130° C. for two hours followed by heating at 190°–200° C. for one hour. A small amount of volatile by-product and excess water was distilled. A product with an acid value of 187 was obtained.

9B. This example used the same ingredient and procedures as described in Example 9A until a clear solution resulted. Then, 66 g of DCPD was added dropwise at 115°–125° C. and the clear solution maintained. After the addition of DCPD, the product was heated at 120°–130° C. for two hours followed by 190°–200° C. for one hour. A product with an acid value of 163 was obtained.

9C. This example used the same procedures as described in Example 9A, except that the initial charge of DCPD was cut by one-half (234 g). After the addition of maleic anhydride, the reaction temperature was raised to 115°–125° C. until a clear solution resulted. Then, the other half (233 g) of DCPD was added in such a manner that the clear solution was maintained. The product was heated at 120°–130° C. for two hours followed by heating at 190°–200° C. for one hour. A product with an acid value of 204 was obtained.

9D. This example used the same ingredients and procedures as described in Example 9A, except that the product was not heated at 190°–200° C. This product had an acid value of 217.

Examples 10–12

A four-neck 1000 ml round bottom flask was equipped with a stirring rod, a thermocouple, an air inlet tube, and a Barrett distilling receiver connected to a condenser. The flask was charged with 140 g of the recycle polyol reactant (hydroxy number 540) obtained from Example 8 and a stoichiometric amount of the carboxylic acid monomers obtained in Example 9. The mixture, with 0.1 phr hydrated monobutyltin oxide (Fastat 4100 brand of M & T Chemicals Inc.) and 50 ppm of hydroquinone, was heated at 190°–210° C. until its acid value was about 40. The product was cooled and thinned with styrene (including inhibitor) to form a resin at 70.7% non-volatiles. Variations and characteristics of the resins are listed in Table III. Clear castings (0.125 inch×11 inch×11 inch) of the corresponding resins were made with 1 phr of benzoyl peroxide at 180° F. for one hour and post cured at 280° F. for one hour. The clear castings were evaluated by using ASTM methods (D-638, D-790, and D-648). Their data also are listed in Table III.

TABLE III

| Example no. | 10 | 11 | 12 |
|---|---|---|---|
| Recycle Polyol Reactant (g) | 140 | 140 | 140 |
| Acid Monomer (g)-Example no. | 404-Ex. 9a | 371-Ex. 9c | 463-Ex. 9b |
| Ratio of OH/acid | 1/1 | 1/1 | 1/1 |
| Resin | All resins were adjusted with styrene to provide 70.7% non-volatiles | | |
| Acid Value | 32.8 | 28.8 | 30.4 |
| Viscosity at 25° C. (cps) | 1900 | 2050 | 700 |
| SPI Gel Time (Min.) | 8.5 | 6.7 | 8.3 |
| PET (Min.) | 13 | 11 | 13.5 |
| PEF (°F.) | 314.6 | 317 | 295 |
| Physical Properties of Clear Castings | | | |
| HDT (°C.) | 81.9 | 80.0 | 69.6 |
| Tensile (psi) | 7400 ± 400 | 6900 ± 400 | 6500± 200 |
| Tensile Elongation | 1.6 ± 0.2 | 1.4 ± 0.1 | 1.4 ±0.1 |
| Tensile Modulus (ksi) | 520 ± 80 | 560 ± 140 | 510 ± 50 |
| Flexural Modulus (ksi) | 560 ± 20 | 560 ± 4 | 560 ± 20 |
| Flexural Strength (psi) | 12600 ± 1600 | 11600 ±1000 | 7900 ±700 |

Examples 13–15

SMC panels containing isophthalate resins (Aropol 7221 and Aropol 7320 brand of Ashland Chemical Inc.) or containing an orthophthalate resin (Aropol Q6710-1 brand of Ashland Chemical Inc.) were ground into powder. The SMC powder was digested with diethylene glycol and a catalyst in a two gallon autoclave. The resulting product was stripped at 150° C. under vacuum.

The resulting recycle polyol reactant products were used to react with a stoichiometric quantity of a carboxylic acid monomer (Example 9D) using the same procedures as described in Example 10. Characteristics and physical data of the corresponding clear castings were recorded. Regular SMC panels without phthalate moieties were processed under the same conditions (Example 15). Reaction conditions and results recorded are displayed in Table IV.

TABLE IV

Characteristics of Recycled Resins from Various Types of SMC

| Example | 13 | 14 | 15 |
|---|---|---|---|
| Type | Isophthalate SMC | Orthophthalate SMC | Regular SMC |
| Hydroxyl Number of the resulting Polyester Polyors after Adjustment with Diethylene Glycol | 560 | 560 | 560 |
| Acid Value of DCPD/ Maleate Half Ester | 219 | 219 | 219 |
| Formulated Resins Contained 25% Styrene | | | |
| Acid Value (Resin) | 20 | 8.9 | 23 |
| Viscosity (cps @ 25° C.) | 660 | 1860 | 600 |
| SPI Gel Time (Minutes) | 2.8 | 1.9 | 10.2 |
| PET (Minutes) | 6.3 | 4.5 | 13.3 |
| PEF (°F.) | 257 | 223 | 283 |
| Physical Properties of Clear Castings | | | |
| Tensile Strength (psi) | 6000 ± 1100 | 4500 ± 300 | |
| Tensile Elongation (%) | 2.3 ± 0.6 | 2.6 ± 0.4 | |
| Tensile Modulus (ksi) | 344 ± 14 | 227 ± 8 | |
| Flexural Modulus (ksi) | 370 ± 11 | 260 ± 8 | |
| Flexural Strength (psi) | 12800 ± 700 | 7300 ± 1600 | |

Example 16

This example demonstrates the reuse of the recycled resin in SMC applications. In a sheet molding compound (SMC) formulation (PHASE ALPHA brand of Ashland chemical Inc.), 60% of the unsaturated polyester base resin was replaced by using the recycled resin of Example 15. SMC sheets were made and molded together under standard conditions to form panels (0.125 inch thickness). The panels appeared to be similar to those made with virgin resins.

Example 17

A four neck 500 ml round-bottom flask was equipped with a stirring rod, a thermocouple, an air inlet tube, and a Barrett distilling receiver connected to a condenser. The flask was charged with 92.7 g of a recycle polyol reactant (hydroxy value 450), 82.6 g of glacial methacrylic acid, 52.5 mg of hydroquinone, and 273 g of toluene. The mixture was stirred and heated to make a solution. Shortly after it started to reflux, 3.25 of methanesulfonic acid was added as the catalyst. The solution was refluxed at 117°–118.5° C. for about 10 hours until the hydroxy value reached 20. The resulting product then was neutralized with calcium hydroxide and filtered. The filtrate then was stripped of the solvent at 70° C. under vacuum. About 126 g of product was obtained. The product, a free flowing liquid, tested to have an acid value of 8.4 and a hydroxy value of 10.7. The product was curable to a solid material using a conventional initiator such as MEKP and a cobalt promoter at room temperature or at an elevated temperature.

Example 18

In order to demonstrate the application of the recycle polyol reactant product with polyisocyanates, a formulation containing 12 g of a recycle polyol reactant product (hydroxy number 557, acid value 4) and 20 mg dibutyltin dilaurate catalyst was mixed with 16 g of diphenylmethane diisocyanate (LF 168 brand of Mobay Chemical Company) for 30 seconds. The mixture was poured into a glass mold which was being heated at 60° C. The formulation cured into an open cell foam in five minutes. The foam was post cured at 100° C. for one hour. Additives and techniques used in polyurethane technology can be adapted to other compositions using the recycled product.

We claim:

1. A method for treating filled or untilled, crosslinked unsaturated polyester, for deriving an alcohol recycle reactant useful in the synthesis of alcohol-foraged derivative products, which comprises the steps of:
   (a) attriting said unsaturated polyester to form unsaturated polyester particulates;
   (b) separating at least a fraction of any filler and glass fiber from said unsaturated polyester particulates to form a unsaturated polyester regrind;
   (c) subjecting said unsaturated polyester regrind to one or more of agitated (1) uncatalyzed glycolysis in the presence of excess glycol or (2) catalyzed glycolysis in the presence of excess glycol and a transesterification catalyst, under agitation at elevated transesterification temperature, the molar ratio of hydroxyl groups from said glycol to ester groups from said unsaturated polyester being not less than about 4:1, and being effective to form a soluble recycle alcohol reactant; and
   (d) recovering said recycle alcohol reactant for use in the synthesis of alcohol-formed derivative products.

2. The method of claim 1, wherein said particulates are not greater in average particle size than about 1 mm.

3. The method of claim 2, wherein said particulates are not greater in average particle size than about 0.1 min.

4. The method of claim 1, wherein step (c) precedes step (b).

5. The method of claim 1, wherein said cured unsaturated polyester comprises sheet molding compound (SMC).

6. The method of claim 1, wherein the molar ratio of hydroxyl groups of the glycol to ester groups of the unsaturated polyester in step (c) ranges from about 4:1 to about 30:1.

7. The method of claim 1, wherein said glycol is one or more of ethylene glycol, diethylene glycol, triethylene glycol, polyethylene glycol, propylene glycol, dipropylene glycol, polypropylene glycol, 1,3-butanediol, 1,4-butanediol, neopentylglycol, cyclohexane dimethanol, 2,2,4-trimethyl pentanediol, bisphenol A, trimethylol ethane, trimethylol propane, dicyclopentadiene glycol, and dibrominepentyl glycol.

8. The method of claim 1, wherein said elevated transesterification temperature ranges from between about 100° and 300° C.

9. The method of claim 8, wherein said elevated transesterification temperature ranges from about 170° to 250° C.

10. The method of claim 1, wherein step (c) is conducted at about atmospheric pressure.

11. The method of claim 1, wherein step (c) is conducted under conditions of high shear agitation.

12. The method of claim 1, wherein step (c) glycolysis is conducted for a time period of between about 1 and 30 hours.

13. The method of claim 1, wherein said unsaturated polyester is filled with glass.

14. The method of claim 1, wherein said recycle alcohol reactant is represented by:

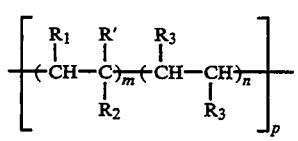  (I)

and optionally a second composition type of structure represented by:

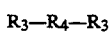  (II)

and optionally a third composition derived from glycolysis of polyvinylacetate, polymethyl methacrylate and those commonly used a slow profile additives, where 1) m, n, p are any integers $\geq 0$;
2) one of $R_1$ or $R_2$ is a hydrogen, and the other of $R_1$ and $R_2$ is one of the following groups: phenyl or

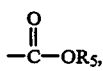

where $R_5$ is a hydrogen atom or a $C_1$-$C_8$ group;
3) R' is a hydrogen atom or a methyl group;
4) $R_3$ is

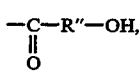

where R" is

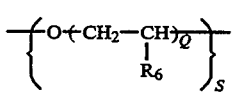

where $Q \geq 1$ and $S \geq 1$, $R_6$ is a hydrogen or a methyl or ethyl group.
$R_4$ is

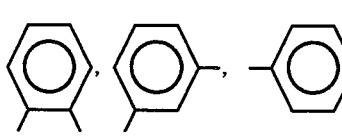

where x=2,3, or 4.

15. The method of claim 1, wherein an unsaturated polyester product is made from step (d) and is represented by:

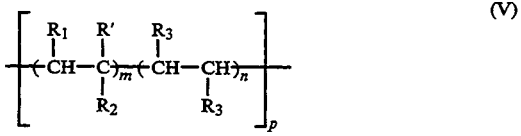  (V)

and optionally a second composition type of structure represented by:

  (II)

and optionally a third composition derived from glycolysis of polyvinylacetate, polymethyl methacrylate and those commonly used a slow profile additives, where 1) m, n, p are any integers $\geq 0$;
2) one of $R_1$ or $R_2$ is a hydrogen, and the other of $R_1$ and $R_2$ is one of the following groups: phenyl or:

where $R_5$ is a $C_1$-$C_8$ group;
3) R' is a hydrogen atom or a methyl group;
4) $R_3$ is

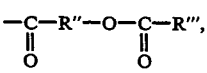

where R" is

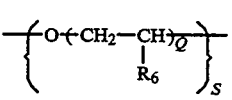

where $Q \geq 1$ and $S \geq 1$, $R_6$ is a hydrogen atom or an alkyl group;
R''' is one of the following groups:

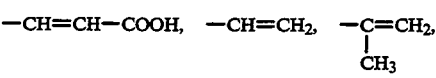

 and

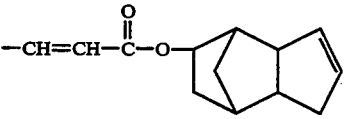

$R_4$ is

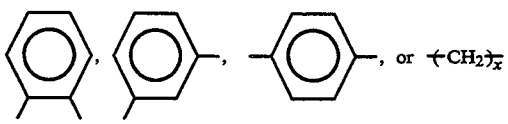

where x=2, 3, or 4.

16. The method of claim 15, wherein said unsaturated polyester product is curable alone or with an ethylenically-unsaturated monomer to form a filled or unfilled cured recycle-unsaturated polyester.

17. The method of claim 16, wherein said filled or unfilled cured recycle unsaturated polyester is recycled to step (a) of the method.

18. An alcohol reactant represented by the following general structure:

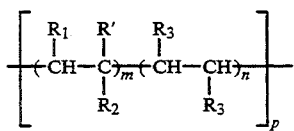   (I)

optionally a second composition type of structure represented by:

$R_3—R_4—R_3$   (II)

and optionally a third composition derived from glycolysis of polyvinylacetate, polymethyl methacrylate and those commonly used a slow profile additives, where 1) m, n, p are any integers $\geq 0$;

2) one of $R_1$ or $R_2$ is a hydrogen, and the other of $R_1$ and $R_2$ is one of the following groups: phenyl or

where $R_5$ is a hydrogen atom or a $C_1$–$C_8$ group;

3) R' is a hydrogen atom or a methyl group;

4) $R_3$ is

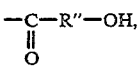

where R''

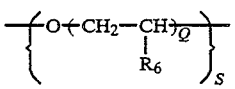

where $Q \geq 1$ and $S \geq 1$, $R_6$ is a hydrogen or a methyl or ethyl group.

$R_4$ is

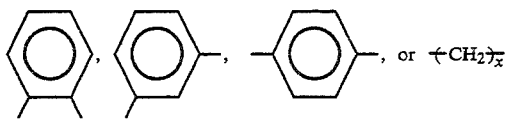

where x=2,3, or 4.

19. The method of claim 1, wherein the molar ratio of hydroxyl groups of the glycol to ester groups of the unsaturated polyester in step (c) ranges from about 8:1 to about 30:1.

* * * * *